(12) United States Patent
Woestmann et al.

(10) Patent No.: US 11,033,956 B2
(45) Date of Patent: Jun. 15, 2021

(54) CASTING DEVICE AND METHOD FOR USING SAME

(71) Applicant: FRAUNHOFER-GESELLSCHAFT ZUR FOERDERUNG DER ANGEWANDTEN FORSCHUNG E.V., Munich (DE)

(72) Inventors: Franz-Josef Woestmann, Muenster (DE); Michael Heuser, Bremen (DE); Matthias Busse, Bremen (DE)

(73) Assignee: Fraunhofer-Gesellschaft Zur Foerderung Der Angewandten Forschung E.V., Munich (DE)

( * ) Notice: Subject to any disclaimer, the term of this patent is extended or adjusted under 35 U.S.C. 154(b) by 0 days.

(21) Appl. No.: 16/961,296

(22) PCT Filed: Jan. 9, 2019

(86) PCT No.: PCT/EP2019/050465
§ 371 (c)(1),
(2) Date: Jul. 10, 2020

(87) PCT Pub. No.: WO2019/137969
PCT Pub. Date: Jul. 18, 2019

(65) Prior Publication Data
US 2021/0078068 A1     Mar. 18, 2021

(30) Foreign Application Priority Data

Jan. 12, 2018 (DE) .......... 10 2018 200 504
Apr. 12, 2018 (DE) .......... 10 2018 205 583

(51) Int. Cl.
 *B22C 9/10* (2006.01)
 *B22C 9/22* (2006.01)
 *H02K 15/04* (2006.01)

(52) U.S. Cl.
CPC .......... *B22C 9/103* (2013.01); *B22C 9/108* (2013.01); *B22C 9/22* (2013.01); *H02K 15/045* (2013.01)

(58) Field of Classification Search
CPC .......... B22C 9/10; B22C 9/103; B22C 9/108; B22C 9/22; H02K 15/045
See application file for complete search history.

(56) References Cited

U.S. PATENT DOCUMENTS

2006/0211567 A1    9/2006   Kuhn et al.

FOREIGN PATENT DOCUMENTS

DE    2944534 A1    5/1980
DE    10335224 A1    3/2005
(Continued)

OTHER PUBLICATIONS

M. Groeninger et al., Casting Production of Coils for electrical Machines, 2011 1st International Electrical Drives Production Conference (EDPC), IEEE, Sep. 28-29, 2011, 3 pages, 159-161, Nurembourg, Germany, Publication XP032000385.
(Continued)

*Primary Examiner* — Kevin E Yoon
(74) *Attorney, Agent, or Firm* — Marshall & Melhorn, LLC (57) ABSTRACT

A casting device having a casting mold and a core for producing a helical casting is described. The may have an expendable core that can be dissolved after the casting process. Advantageous effects of the device and process can be achieved by virtue of the fact that the female mold for accommodating the helical casting during the casting process is formed completely within the outer contour of the core, the female mold being delimited by the core and, at the peripheral boundary surfaces of the female mold, by the casting mold.

25 Claims, 3 Drawing Sheets

(56) References Cited

FOREIGN PATENT DOCUMENTS

| | | | |
|---|---|---|---|
| DE | 69433631 T2 | | 3/2005 |
| DE | 102010020897 A1 | | 11/2011 |
| DE | 102012006572 A1 | | 7/2013 |
| DE | 102016202657 A1 | | 8/2017 |
| EP | 0782555 B1 | | 3/2004 |
| EP | 2387135 A2 | | 11/2011 |
| EP | 2688183 A2 | | 1/2014 |
| EP | 3208013 A1 | | 8/2017 |
| GB | 2042951 B | | 8/1982 |
| JP | 2004336969 A | * | 11/2004 |
| JP | 2015002614 A | | 1/2015 |
| JP | 2015009259 A | | 1/2015 |

OTHER PUBLICATIONS

Christoph Pille and Felix Horch; "Von der Idee zum gießtechnisch umgesetzten Produkt, Forschung und Entwicklung aus einer Hand", Fraunhofer IFAM, Fraunhofer Institute for Manufacturing Technology and Applied Materials Research (IFAM), Oct. 2011, Lightweight Roadshow 2011, Germany, Publication XP055363839; URL: http://alumag.com/wp-content/uploads/2013/11/RSAL10.2011FraunhoferLecture.pdf.

European Patent Office, The International Search Report with Written Opinion, issued in PCT/EP2019/050465, dated Feb. 15, 2019, 15 pages, European Patent Office, Rijswijk, Netherlands.

The International Bureau of WIPO, International Preliminary Report on Patentability, dated Jul. 14, 2020, 14 pages, The International Bureau of WIPO, Geneva, Switzerland.

* cited by examiner

CASTING DEVICE AND METHOD FOR USING SAME

BACKGROUND

The invention lies in the field of engineering, more precisely of casting technology and is particularly advantageously applicable to the serial production of aluminium die castings or copper die castings.

One possible application of demanding die castings of aluminium, copper or their alloys is, for example, the manufacture of spirals which can be used as electrical coils.

Mechanical springs are also manufacturable in the die casting method as spirals of aluminium or other casting materials.

At present, it is essentially wound coils of copper which are used as electrical coils, for example in the case of electrical machines. Using a wound wire results in an incomplete utilisation of the available construction space (55% degree of filling given a round wire up to approx. 70% degree of filling given a profile wire). Furthermore, copper is expensive as a material and an electrical insulation of the windings with respect to one another and of the coil with respect to other components, is necessary on winding a wire. Apart from the electric insulation, the insulation material must be thermally stable and have the highest possible degree of thermal conductivity. Currently applied insulation materials for conventional wound wires, however, only have a low thermal conductivity. In combination with the low contact surface between the windings and the thermal sink in the form of the sheet lamination bundle, the thermal dissipation from a conventional coil is poor.

Electrical windings with a high power density for producing large torques in the case of electrical machines are created by way of the application of die cast metal coils, in particular aluminium or copper coils. However, the manufacture of complex spiral bodies with regard to casting technology is necessary for this, wherein individual windings of spirals need to be manufactured in a very precise manner and should be separated from one another only by very slight air gaps. Furthermore, the surface of the windings must be as smooth as possible and be absent of burrs at the edges, in order to avoid discharge peaks, as well as have a low as possible surface roughness. In practice, die casting with copper and in particular with aluminium and its alloys creates huge challenges due to a high casting temperature (620° C.-730° C.) and a high post-compression pressure (above 1200 bar). The casting temperature in the case of rotor aluminium (Al content of ≥99.7%) typically lies in the temperature range of >730° C. High demands are thus placed upon the casting mould due to the thermal loading and above all due to the changing temperature loading. It is particularly the latter which causes fractures in the surface of the tool, these leading to surface roughness and burrs on the castings. The same demands are placed upon cores and [mould] slides. Furthermore, in particular rotor aluminium has a strong tendency to adhere (partial alloying) to the tool surface on account of the high affinity for iron, causing the mould removal to become more difficult and leading to the tool being damaged or wearing/scouring of the tool. Since a cleaning or post-machining of the tool is regularly necessary, complicated tool shapes are inefficient in their application. If no sufficient cleaning or post-machining of the tool (of the casting mould) takes place, then irregularities on the surface of the casting result, wherein these entail a significant deterioration in quality of the mechanical and/or electrical characteristics. Furthermore, burrs which need to be removed by post-machining entailing an additional expense arise in the case of slides and cores having complex geometries.

SUMMARY

Against the background of the state of the art, it is the object of the present invention to provide a casting device and a method for manufacturing spiral-shaped castings, which allow for the manufacture of high-quality die castings with the least possible amount of effort and at the same time allow for repeated use of the casting mould with little effort.

According to the invention, the object is achieved by a casting device with the features of patent claim 1. The patent claims 2 to 17 represent advantageous embodiments of a casting device. The patent claims 18 and the following relate to a method for the use of such a casting device. The patent claims 24 and 25 relate to a manufacturing method for cores or mould parts.

Accordingly, the invention relates to a casting device with a casting mould and a core, for the manufacture of a spiral-shaped casting, wherein the core is designed as a lost core which can be disintegrated after the casting.

One additionally envisages the female mould, in order to receive the spiral-shaped casting on casting to be formed completely within the outer contour of the core, wherein the female mould is delimited by the core on the one hand as well as, at its peripheral-side delimitation surfaces, by a casting mould on the other hand. Herein, the casting mould can consist of the disintegratable material, in particular of the core material or of steel or of a combination of both.

Due to the use of a lost core, for example in the form of a salt core, demands with regard to the correct dimensional accuracy of the casting, to the flow lengths within the mould, which can exceed 150 mm, as well as to a complex, delicate geometry and a low wall thickness of the casting (<1 mm) can be fulfilled. Since the core is only used once for each casting, high surface qualities, for example a low surface roughness and post-machining demands, can be realised. Due to the high degree of freedom on shaping, fillets of the windings in the case of spiral-shaped castings can be easily realised on the radially outer side as well as on the radially inner side of the spirals by way of a suitable shaping of the core. The use of slides, as are applied in the case of permanent cores, is avoided or reduced and the formation of burrs or edges which result with the use of such slides can be avoided, or with regard to the economic efficiency the burrs can be positioned such that they are simple to post-machine or do not compromise the functioning of the component. Due to the fact that the shape of the casting up to its outer delimitation surfaces is defined by the core, the actual casting mould (permanent mould) for replicating the contour of the casting without a casting system only forms the delimitation of the casting in a very small region of at the most 20%, in particular less than 10%, further in particular less than 5% of the surface of the casting. It is only in this region of its surface that the casting mould comes into contact with the metal melt on casting. These surfaces, in which the metal melt comes into direct contact with the casting mould, are consequently small, so that adhesions and an alloying of the casting material onto the casing mould are simple to remove. These surfaces can make up at least 0.5%, or at least 1% or 2% of the surface of the casting. The casting mould can furthermore have a geometrically simple and smooth shape, so that a post-machining of the casting mould is simple.

Conversely, 80% or more of the surface of the casting with respect to its shape is defined by a core. The sections of the outer mould which delimit the female mould and come into contact with the metal melt can each be designed as sections of a cylinder surface or of a cone surface.

The core can be cast, pressed or printed in a 3D printing method as a salt core, wherein a disintegration of the core can be effected for example by way of mechanical shock, collapsing as a result of an impact or a pressure change, or by way of dissolving in a solvent.

Additionally to the sections which delimit the outer sides of the windings of a spiral to be manufactured, it is only regions for feeding and regulating the flow of the metal melt and for the mould filling the metal, such as gates, overflows and vents which are formed in the casting mould/permanent mould. The core can therefore be free of volumes which serve for guiding the metal melt, without later representing a part of the casting.

One can further envisage the core defining the radially inner-lying contour of one or more windings of the spiral-shaped casting as well as the contour of one or more or all windings up to their radially outer delimitations. The filleting of the windings of the spiral at the radially outer side of the spiral can be defined by the shaping of the core and of the female mould which is formed in it, wherein a radially outer-lying part of the female mould is delimited by the outer mould/permanent mould, so that the metal melt contacts the permanent mould there.

A supporting of the core and a relieving of the load during the casting procedure thus takes place. The shape of the casting is therefore defined by a single core, wherein no slides are necessary due to the ability of the core to be disintegrated. Occurrences of wear and inhomogeneities of the casting procedure are avoided due to the problem-free series manufacture.

One can also envisage the core consisting of a ceramic material, in particular silicon nitride, silicon carbide, boron nitride or boron carbide. Such and similar materials are stable with regard to very rapid temperature changes and can be manufactured in a precise and reproducible manner and in particular can be well sintered.

One can further envisage the core consisting entirely of a continuous part. Joints in the core region may thus be completely avoided. The core may, however, also consist of several parts, in order to create more complex shapes.

Furthermore, one can envisage the core consisting of at least one part which is manufactured by sintering. Herein, the core can be sintered to such an extent that it holds together in the casting process, but can be disintegrated under the influence of shocks or other mechanical loading after the casting process. The partial sintering of the core can be realised by limiting the sintering time and/or the sintering temperature.

One can also envisage the core consisting of several parts which in particular define two spiral-shaped cavities which are offset to one another in the direction of the longitudinal axis of the spiral, as a female mould for one or more castings.

One can envisage the casting mould in at least one first region forming a peripheral-side delimitation surface of the female mould for the spiral of the casting and bearing on the core in the regions which are directly adjacent to the first region.

Due to the fact that the casting mould bears on the core or this on the casting mould, the core can support itself on the casting mould in a mechanically stabilising manner and thereby successfully withstand the high pressures of a die-casting procedure.

Advantageously, one can also envisage the casting mould bearing on the core directly along at least one surface which runs spirally about the axis of the female mould of the spiral-shaped casting.

This results in a stable support of the core at a multitude of support locations or support regions of the casting mould.

In order to further perfect such a supporting, a heating of the core can be envisaged before the actual casting process, in order to adjust a temperature creating the outer dimensions of the core which are created by the thermal expansion of the core, so that the core can be inserted into the casting mould in a precisely fitting manner. The core can just as easily be cooled, in order to reduce the outer dimensions of the core, so that it can be inserted in a precisely fitting manner.

In general, a greater flow length of the metal melt is ensured by way of the use of a salt core, since the material of the core has a good thermal insulating capacity in comparison to metallic casting moulds. If the core is additionally heated before the casting procedure, then an even further improved suitability for casting thin-walled complex shapes is given.

Due to the fact that the contour of the casting is determined essentially by the core, one can envisage the casting mould being designed as a simple hollow body and comprising a cavity for receiving the core, wherein the cavity is designed in a cylindrical, cone-shaped, pyramid-shaped, prism-shaped or cuboid manner and surrounds a longitudinal axis of the female mould of the spiral-shaped casting. Given a constant shape, one can work with cores of the same geometry which corresponds to the mould, but with a varying female mould. This means that different geometric variants e.g. of a coil can be manufactured with one metallic tool geometry of the casting mould.

Such simple geometric shapes of the casting mould whose longitudinal sections comprise delimitation lines which are continuously straight permit a simple cleaning and removal of alloyed-on parts of the casting material as well as a good post-machining ability of the casting mould in the case that these should become partially damaged by way of the high loading with the die casting procedure. For example, the formation of fractures on the casting mould could result, wherein such can be dealt with by way of post-grinding or a material-removing machining, in order not to compromise the surface quality of the casting which is to be manufactured.

In order to achieve the best possible cleaning and machining ability of the casting mould, one can also envisage the inner wall/inner walls of the casting mould having a cylindrical, conical, pyramid-shaped, cuboid or polyhedral, in particular smooth shape at least in the region/the regions in which it/they form a peripheral-side delimitation surface of the female mould for the spiral-shaped casting. This shape can advantageously run in a straight manner without curvature in the longitudinal section of the casting mould.

Furthermore, one can advantageously envisage the casting mould consisting of a metal or of a metal alloy, further in particular of steel.

By way of the described geometric design of the casting mould, this is particularly simple to post-machine, so that inexpensive tool steels can be used for the casting mould.

If the core is to be mechanically supported in the casting mould, then the necessary strength can be achieved by way of the design of the casting mould from steel.

One can also envisage the casting mould comprising a mould part which is inserted into an outer part or a permanent mould of metal, in particular steel and which can be disintegrated in particular after the casting.

In this case, the mould part, which is designed in a hollow manner, at its inner side replicates the outer contour of the casting to be manufactured and the female mould of a spiral to be manufactured is determined exclusively by the core and the mould part. An outer part of metal which forms the actual permanent mould and which has the mechanical strength for supporting the core and the mould part does not come into direct contact with the metal melt in this case. The mould part and the core which come into contact with the metal melt during the casting process are each used only once and are removed/disintegrated after the casting.

The mould part can then be designed in a single part or two part/multi-part manner and in the put-together mould can provide a cavity for the core, said cavity having the shape of a cylinder, a hollow cone or a hollow pyramid or a hollow cuboid or another prismatic polyhedron.

The mould part can advantageously consist of the same material as the core. In this case, the mould part can be disintegrated before, after or simultaneously with the core, and the same method as for disintegrating the core can be used for the disintegration. One can further generally envisage the casting device being configured for aluminium die casting. For this, it is important for example for the casting device to have the necessary mechanical stability and temperature resistance capability. Furthermore, the casting mould should comprise suitable channels for feeding the metal melt and for venting as well as for mould filling. Such channels can be provided at least partly also in the mould part. By providing a plurality of channels, the injection pressure can be distributed onto the length of the core/of the casting to be manufactured, so that the mechanical loading of the core can be limited.

One can therefore envisage the casting mould (permanent mould or die) comprising, in the outer mould, at least one casting channel for 3 turns at a time of the spiral which is to be cast, in particular at least one casting channel for 2 turns at a time, further in particular at least one casting channel for each turn of the spiral to be cast, wherein the casting channels in particular are distributed along the longitudinal axis of the spiral to be cast, in particular distributed in a uniform manner, further in particular in an equidistant manner along the longitudinal axis of the spiral.

This results in an optimised distribution of the high pressure with which the metal melt is pressed into the casting mould and to which the core is also subjected.

One can further envisage at least one, in particular several of the casting channels within the casting mould (permanent mould) comprising an extension space or being connected to an extension space which serves for compensating and damping pressure peaks.

Furthermore, one can envisage the core being composed of several parts which each define different longitudinal sections of the spiral to be cast and which in particular have different pitches of the spiral.

Herewith, a high variability of the casting device is achieved. The individual cores can be releasably or non-releasably connected to one another by way of common joining techniques.

In addition to a casting device of the type explained above, the invention is also directed to a method for the use of such a casting device. Herein, one can envisage for example the core being expanded by way of heating such that it is adapted to the size of the casting mould in an exactly fitting manner.

The cores can be reproducibly manufactured for example in a separate mould with an adequately large accuracy, for example with tolerances <0.2 mm, so that it is known at which temperature the expansion of each core is dimensioned such that it fits into the casting mould in an exactly fitting manner. The core can then be heated to the desired temperature before it is inserted into the casting mould, that is before the casting procedure.

On the other hand, one can also envisage inserting the core into the casting mould by trial and testing the dimensioning before a temperature increase, in order to subsequently possibly further heat the core until it has expanded sufficiently in order to fit into the casting mould in an exactly fitting manner.

The core can also be heated within the casting mould by way of a suitable heating device.

On using a heated core, the characteristics of the casting device can be improved for casting more complex and intricate/delicate castings, so that thin-walled castings can be created with an even better quality.

One can further advantageously envisage removing the casting together with a core from the casting mould after the casting of this casting and being post-machined and the core being removed subsequently thereto.

Since in many cases the manufactured castings have a low mechanical stability, in particular if they consist of pure aluminium, it can be useful to remove gate parts from the casting whilst it is still supported by the intact core. The casting can therefore for example be machined and the core removed only after the removal of excess parts. The core or an insert part can therefore be used as a handling device or support during the handling process after the casting process in order to support the casting during the punching and deburring.

The method for use of the casting device can generally envisage the core being inserted into the casting mould and aluminium or an aluminium alloy subsequently being brought into the casting device at an overpressure at a temperature of more than 690° C. given rotor aluminium, and more than 620° C. given aluminium alloy, in particular at a temperature below 800° C.

Herein, one can further envisage a post-compression pressure of at least 500 bar, in particular at least 1000 bar, further in particular at least 1200 bar being applied.

One can also envisage a melt of copper or of a copper alloy being brought in for manufacturing a casting, for a casting device according to the invention.

Furthermore, one can envisage one or more regions being filled with the casting material in the cavity between the disintegrable core and the casting mould before the casting of the casting, in a manner such that the core is supported in this region/these regions after the solidifying of the casting material.

This allows for one or more support regions to be incorporated into the casting mould by way of casting at a low pressure before a casting at a high pressure.

A method for manufacturing a core or a core part or a mould part for a casting device according to the invention can further be configured such that the core is formed and sintered from a sinter material, in particular silicon nitride, silicon carbide, boron nitride or boron carbide, wherein the sintering procedure is terminated before reaching the greatest possible mechanical stability of the sintered body, in particular on reaching the lowest possible stability which ensures cohesion of the sintered body given a subsequent metal casting procedure.

A further method for manufacturing a core or a core part or a casting mould can envisage a body firstly being formed from a sinter material by way of freeze gelation or injecting a ceramic feedstock and this body subsequently being at least partly sintered.

The invention can further relate to a casting device and/or to a method of the following type:

A casting device with a casting mould and with a core for manufacturing a spiral-shaped casting, wherein the core is designed as a lost core which can be disintegrated after the casting, characterised in that the female mould for receiving the spiral-shaped casting is formed completely within the outer contour of the core on casting, wherein the female mould, on the one hand, is delimited by the core as well as, on the other hand, at its peripheral-side delimitation surface, by the casting mould, wherein the core defines the radially inner-lying contour of one or more windings of the spiral-shaped casting as well as the contour of one or more or all windings up to their radially outer delimitations, wherein the core consists of at least one part of a ceramic material which is manufactured by way of partial sintering and wherein the casting mould consists of metal or a metal alloy or comprises a mould part which is inserted into an outer part or a permanent mould of metal and which can be disintegrated after the casting.

A method for manufacturing a metallic, spiral-shaped casting, characterised in that a core is formed and sintered from a sinter material by way of a body first being formed from a sinter material and this being partly sintered thereafter, wherein the sintering procedure is terminated before reaching the largest possible mechanical stability of the sinter body and wherein the core is expanded or contacted by way of temperature change in a manner such that it is adapted to the size of the casting mould in a precisely fitting manner, wherein the core is inserted into a casting mould and a metal melt in the form of aluminium, an aluminium alloy, copper or a copper alloy is brought into the casting mould.

BRIEF DESCRIPTION OF THE DRAWINGS

The invention will be shown hereinafter and then explained with reference to figures of a drawing.

In the drawings.

DETAILED DESCRIPTION

Figure 1:
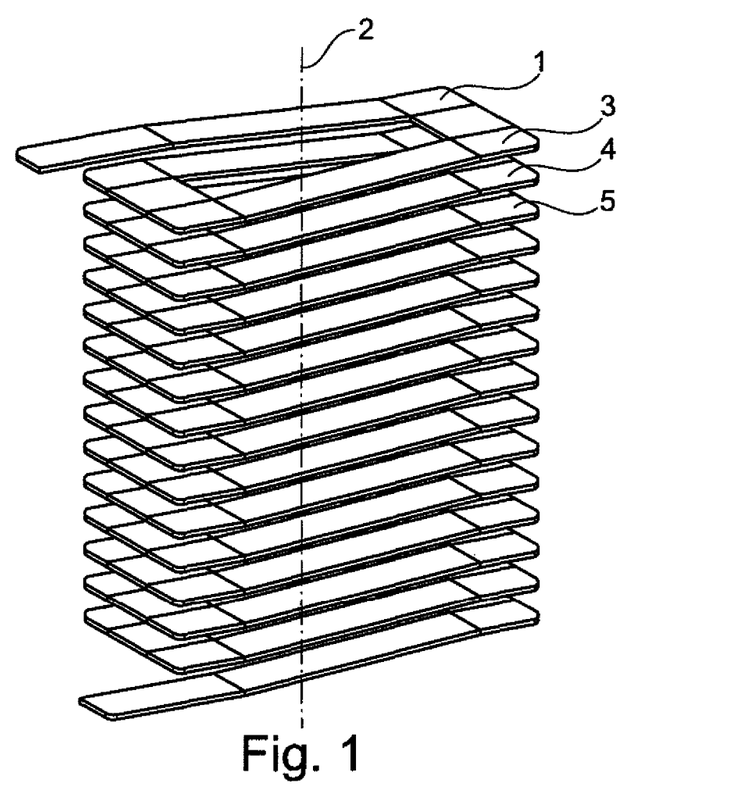
FIG. 1 shows, in a perspective representation, a spiral-shaped casting as can be manufactured with the casting device according to the invention.

FIG. 1 shows a perspective view of a spiral-shaped cast body 1 which can represent an electrical coil or an elastic spring of metal. The individual turns or windings 3, 4, 5 of the spiral wind around a longitudinal axis 2. In this example, the spiralled, strand-like body has a roughly rectangular cross section with rounded corners. This can be useful, for example, with the application as an electrical coil in order to avoid field distortions and discharge peaks and to provide a large as possible conductive cross section. Other possible spiral-shaped cast bodies can consist of strand-like, spiralled bodies which for example comprise round or oval or also differently profiled cross sections.

Figure 2:
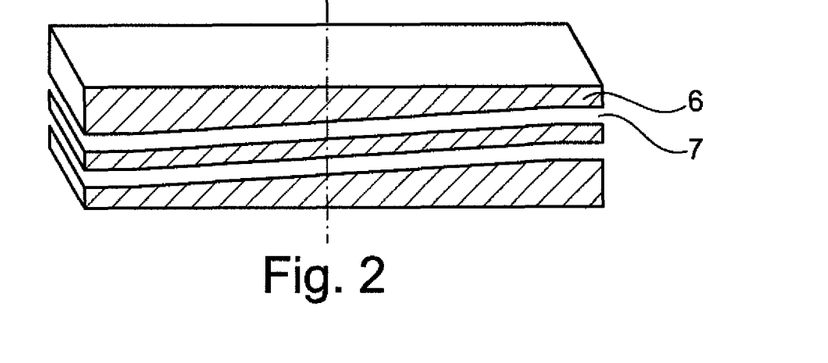
FIG. 2 shows a core for insertion in a casting device.

FIG. 2 in a perspective view schematically shows a pressed salt core 6 whose front side is represented in a hatched manner for a better overview and which comprises a spiral-shaped cavity in its inside. This forms the female mould of the spiral-shaped casting which is to be manufactured. The cavity is indicated at 7 in FIG. 2. The salt core 6 for example can be designed as a pressed or compacted salt core. It can be collapsible after use, for example by way of applying mechanical impulses, or be able to be disintegrated in another manner, for example by way of a solvent.

Apart from salt cores, other lost cores can also be applied in this context.

Figure 3:
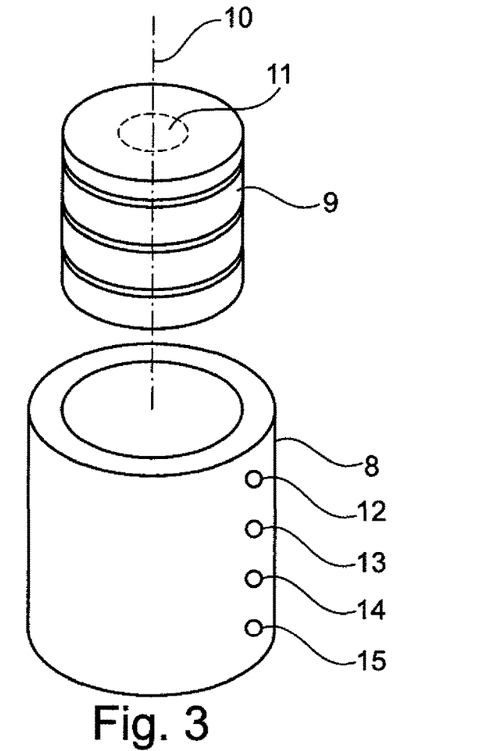
FIG. 3 shows a cylindrical casting device in a perspective view.

FIG. 3, in a perspective view, shows a casting mould 8, for example of a tool steel, which is designed as a hollow cylinder. A round core 9 with a spiral-shaped cavity, which defines the shape of the spiral-shaped cast body, is shown thereabove. The core 9 along its axis 10 comprises a cylindrical cavity 11. The mass of the core can be reduced by way of this and its collapse after use can be simplified.

Casting channels 12, 13, 14, 15 are arranged on the periphery of the casting mould 8 and serve for pressing the metal melt into the cavities of the core 9 as uniformly as possible and with a large speed. Venting openings which are not shown and which permit the escape of air from the cavities of the core 9 are also provided on the casting mould 8. One can also envisage providing an air suction device which permits the preparation of the casting device by way of evacuation.

In this example, the channels 12, 13, 14, 15 are distanced to one another along the axis 10 of the casting core and of the casting mould 8 in order to permit a uniform subjection of the individual turns of the spiral-shaped cavity in the core 9 to the metal melt at a high pressure. By way of this, the forces upon the individual regions of the core 9 which can be relatively thin-walled are smoothed out and minimised.

Figure 4:
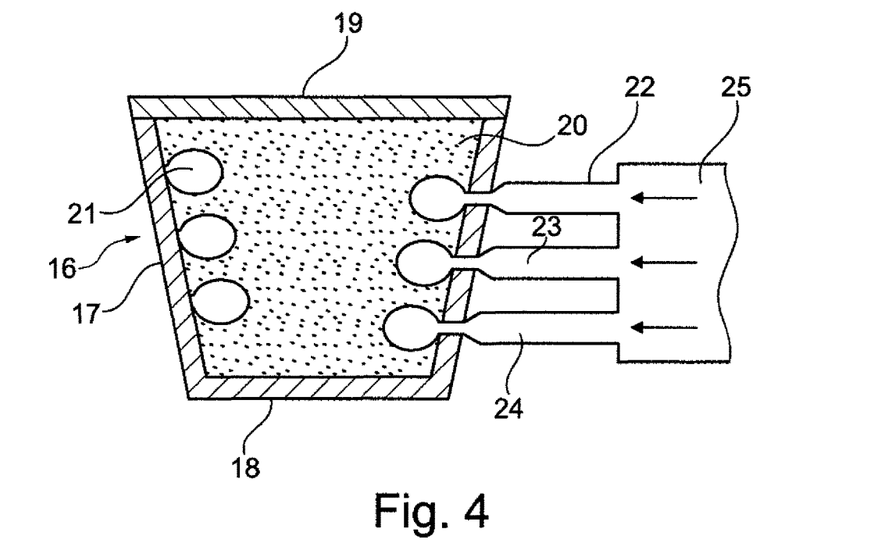
FIG. 4 shows a casting device with a core which is inserted directly into a casting mould in the form of a permanent mould, as well as FIG. 5 shows a longitudinal section through a casting device with a salt core and with a mould part which surrounds the salt core.

A casting mould 16 which comprises an outer wall 17 having the shape of a truncated cone as well as base plate 18 and a cover plate 19 is shown in a longitudinal section in FIG. 4. The interior which is encompassed by the casting mould likewise has the shape of a truncated cone. A core 20 which has the shape of a truncated cone in its outer contour is inserted into the casting mould 16, said core comprising a cavity 21 which is peripheral in a spiral-shaped manner and which completely defines the female mould of the casting to be manufactured. The outer sides of the cavity 21 are each formed by tangentially bearing regions of the wall 17 of the casting mould 16.

The casting channels 22, 23, 24, through which the metal melt is pressed out of a pressure chamber 24 into the casting device, are shown on the right side of the casting mould 16.

The core 20 is preheated in a manner such that it fits into the cavity of the casting mould 16 in an exactly fitting manner. The flow length of the metal melt in the cavity 21 of the core 20 can be optimised by way of the preheating.

Figure 5:
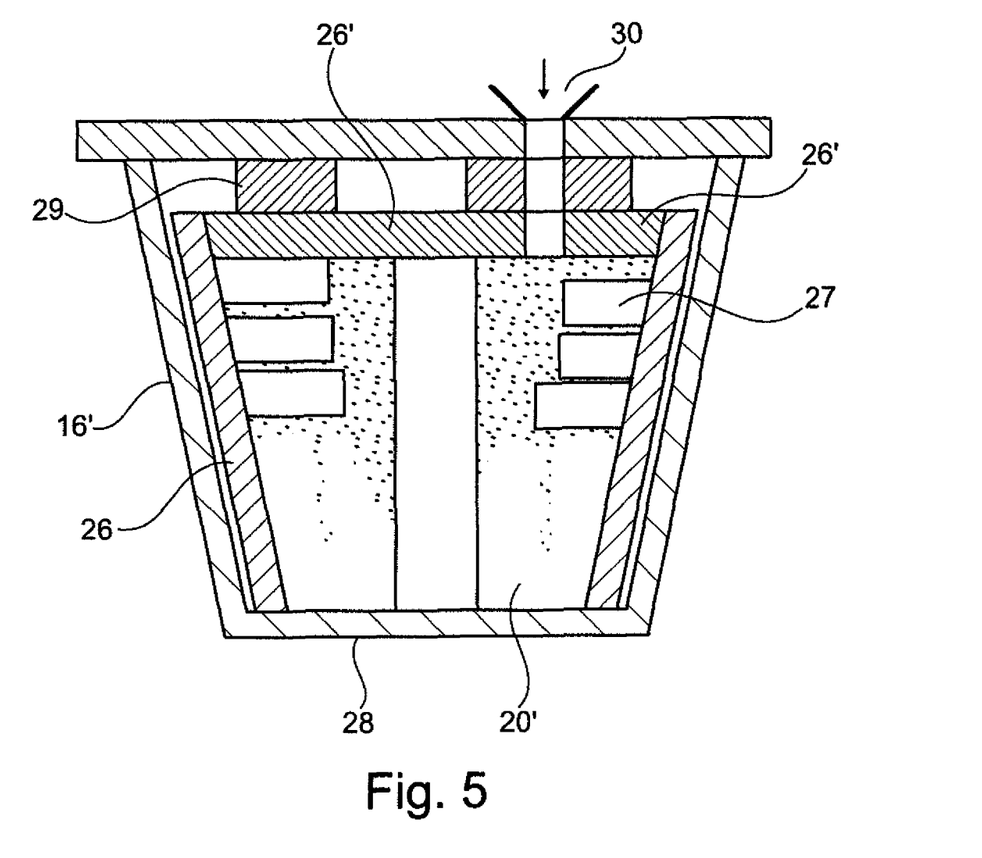

A configuration of the casting device with a casting mould 16' and a mould part 26 which is inserted into this is shown in FIG. 5. The core 20' is surrounded by the mould part 26 within the casting mould 16'. The mould part 26 surrounds a truncated-cone-shaped interior and can itself be designed in a single-part or multi-part manner. The mould part 26 can advantageously be dissolvable and consist for example of the same material as the core 20'.

The use of a mould part 26 has the advantage that the core 20' can be supported on the stable casting mould 16' which consists for example of tool steel, by way of the mould part 26, but that the casting mould 16' itself does not come into contact with the metal melt. After the manufacture of the casting in the female mould 27 which is provided in the core 20' in a spiral-shaped manner, the core 20' as well as the mould part 26 can be removed, i.e. disintegrated, for example.

The core 20' can be applied directly onto the casting mould 16' in the region of the base 28, but an additional mould part which is not represented in FIG. 5 can also be provided in this region, between the core and the casting mould 16'. An additional mould part 26' is represented on the upper side of the core 20' and terminates the core 20' to the top with respect to the casting mould 16' and for its part is supported with respect to the casting mould 16' by support bodies 29. Casting channels 30 can be provided on the upper side of the casting mould 16' and of the mould part 26, 26' as well as in the region of the lateral surface of the casting mould 16' and of the mould part 26, as is basically already shown in FIG. 4. A plurality of casting channels can also pass through the mould part 26 in the region of its lateral surface.

The casting cores which are represented in the figures are each represented as single-part casting cores with a continuous spiral. However, instead of this, combinations of several cores which are joined together in the axial direction, for example with pitches of a spiral which are different in sections, can also be used. The individual cores can be joined together with common joining techniques. At least 90%, in particular at least 95% of the surface of the casting to be manufactured is covered by material of the respective core in the casting process by way of the positioning of the female mould 7, 21 of the casting in the core 6, 20 and the interaction with the casting mould 8, 16, 16' or a mould part 26. Only a very small part of the surface of the casting is therefore covered by metallic material of the casting mould 8, 16, 16' during the casting procedure. By way of this, the region in which the metal melt comes into contact with the casting mould is minimised. The channels for leading the metal melt which pass through the casting mould are less critical since they have no influence on the shaping of the casting or of further castings which are to be manufactured later with the same mould. The regions of the casting mould which are repeatedly cast off are easily accessible and can be machined in a simple manner, in order to eliminate any damage due to fracture formation or the formation of roughness.

In order to remove the core after the casting procedure, the salt core can either be dissolved in the water bath or using a high-pressure water jet, or it can be subjected to an abrupt pressure action. This can be effected in the closed casting mould in a final phase of the casting procedure after completion of the mould filling and solidification procedure. In the process, an abrupt pressure in the mould cavity can be effected by way of introducing a gas, or mechanically via a piston. The core can then flow off as a fluid solution or as a flowable granulate through the core marks, or be removed on opening the casting mould. However, the casting together with the core can also be removed from the mould after the casting process and be processed further, in order for example to remove the gating system by way of punching. In particular, this can be useful with the use of pure aluminium as a metal melt in order to minimise the mechanical loading of the casting on removing the gating system.

It is possible to manufacture coils, spirals, helices and mechanical springs, for example of pure aluminium or aluminium alloy, with the die casting methods in series production in an inexpensive manner with a constant quality by way of the invention. Copper coils for example can be replaced in this manner. A reduction of the wall thickness of the castings in comparison to conventional die casting with steel permanent moulds can be achieved by way of a thermally insulating effect of applied salt cores, so that for example wall thicknesses of less than 1 mm with flow lengths between 10 mm and 100 mm or even up to 500 mm can be realised. Different spirals with variable winding numbers, winding thicknesses and winding widths can be manufactured in the same casting mould by way of the flexible use of disintegrable cores, so that a variant design is possible in a simple manner. The geometric shape of the metallic casting mould is kept simple, so that this can be manufactured in a simple and inexpensive manner as well as easily post-machined.

The invention claimed is:

1. A casting device with a casting mould and with a core for the manufacture of a spiral-shaped casting,
    wherein the core is designed as a lost core which can be disintegrated after a casting process,
    wherein a female mould for receiving the spiral-shaped casting is formed completely within the outer contour of the core, wherein the female mould on the one hand is delimited by the core as well as on the other hand at its peripheral-side delimitation surfaces by the casting mould.

2. The casting device according to claim 1, wherein the core defines the radially inner-lying contour of one or more windings of the spiral-shaped casting as well as the contour of one or more or all windings up to their radially outer delimitations.

3. The casting device according to claim 1, wherein the core comprises a ceramic material, including silicon nitride, silicon carbide, boron nitride or boron carbide.

4. The casting device according to claim 1, wherein the core as a whole consists of a continuous part.

5. The casting device according to claim 1, wherein the core comprises at least one part which is manufactured by sintering.

6. The casting device according to claim 1, wherein the core is comprised of several parts which define, as a female mould for one or more castings, two spiral-shaped cavities which are offset to one another in the direction of the longitudinal axis of the spiral.

7. The casting device according to claim 1, wherein the casting mould in at least one first region forms a peripheral-side delimitation surface of the female mould for the spiral of the casting and in the regions which are directly adjacent to the first region bears on the core.

8. The casting device according to claim 1, wherein the casting mould bears on the core directly along at least one surface which runs spirally about the axis of the female mould of the spiral-shaped casting.

9. The casting device according to claim 1, wherein the casting mould is designed as a hollow body, including as a hollow cylinder, hollow cone, hollow pyramid, hollow prism or hollow cuboid, which on operation surrounds a longitudinal axis of the female mould of the spiral-shaped casting to be cast.

10. The casting device according to claim 1, wherein the casting mould is designed as a hollow body and comprises a cavity for receiving the core, wherein the cavity is designed in a cylindrical, cone-shaped, pyramid-shaped, prism-shaped or cuboid manner and surrounds a longitudinal axis of the female mould of the spiral-shaped casting.

11. The casting device according to claim 1, wherein the inner wall/inner walls of the casting mould, at least in the region/the regions in which it/they form a peripheral-side delimitation surface of the female mould for the spiral-shaped casting, have a cylindrical, conical, pyramid-shaped, cuboid or polyhedral, in particular smooth shape.

12. The casting device according to claim 1, wherein the casting mould is comprised of a metal or of a metal alloy, including steel.

13. The casting device according to claim 1, wherein the casting mould comprises a mould part which is inserted into an outer part or into a permanent mould consisting of metal, including steel, and which can be disintegrated after the casting.

14. The casting device according to claim to 1, wherein the mould part comprises the same material as the core.

15. The casting device according to claim 1, wherein the casting mould is configured for aluminium die casting, wherein the casting mould comprises, in the casting mould, at least one casting channel for 3 turns at a time of the spiral which is to be cast, including at least one casting channel for 2 turns at a time, including one casting channel for each turn of the spiral to be cast, wherein the casting channels are distributed along the longitudinal axis of the spiral to be cast, including in a uniform manner, including in an equidistant manner along the longitudinal axis of the spiral.

16. The casting device according to claim 15, wherein at least one, including several of the casting channels within the casting mould comprise an extension space or are connected to an extension space which serves for compensating and damping pressure peaks.

17. The casting device according to claim 16, wherein the core is composed of several parts which each define different longitudinal sections of the spiral to be cast and which have different pitches of the spiral.

18. A method for the use of a casting device, comprising:
providing a core designed as a lost core which can be disintegrated after a casting process,
wherein a female mould for receiving a spiral-shaped casting is formed completely within the outer contour of the core,
wherein the female mould on the one hand is delimited by the core as well as on the other hand at its peripheral-side delimitation surfaces by the casting mould,
wherein the core is expanded or contracted by way of temperature change in a manner such that it is adapted to the size of the casting mould in an exactly fitting manner.

19. The method according to claim 18, wherein after the casting of the casting, it is removed from the casting mould along with a core and is post-machined, and the core is subsequently removed.

20. The method according to claim 19, wherein the core is inserted into the casting mould and aluminium or an aluminium alloy is subsequently brought into the casting device at an overpressure at a temperature of more than 690° C. including less than 800° C.

21. The method according to claim 20, wherein a post-compression pressure of at least 500 bar, including at least 1000 bar, including at least 1200 bar is applied.

22. The method according to claim 18, wherein a melt of copper or of a copper alloy is introduced for manufacturing a casting.

23. The method according to claim 18, wherein one or more regions are filled with the casting material in the cavity between the disintegrable core and the casting mould before the casting of the casting in a manner such that the core is supported in this region/these regions after the solidifying of the casting material.

24. The method according to claim 18, wherein the core is formed and sintered from a sinter material, including silicon nitride, silicon carbide, boron nitride or boron carbide, wherein the sintering procedure is terminated before reaching the greatest possible mechanical stability of the sintered body, including on reaching the lowest possible stability which ensures cohesion of the sintered body given a subsequent metal casting procedure.

25. The method according to claim 18, wherein a body is firstly formed from a sinter material by way of freeze gelation or injecting a ceramic feedstock and this body is subsequently at least partly sintered.

* * * * *